United States Patent
Barnwell

(10) Patent No.: US 7,326,266 B2
(45) Date of Patent: Feb. 5, 2008

(54) COALESCING TYPE FILTER APPARATUS AND METHOD

(75) Inventor: James W. Barnwell, Atlantic Beach, NC (US)

(73) Assignee: Flair Corporation, Ocala, FL (US)

( * ) Notice: Subject to any disclaimer, the term of this patent is extended or adjusted under 35 U.S.C. 154(b) by 52 days.

(21) Appl. No.: 10/697,868

(22) Filed: Oct. 31, 2003

(65) Prior Publication Data

US 2005/0092179 A1   May 5, 2005

(51) Int. Cl.
*B01D 46/10* (2006.01)

(52) U.S. Cl. ............................ 55/319; 55/323; 55/333; 55/486; 55/337; 55/329; 55/DIG. 17; 55/421; 137/204; 137/495

(58) Field of Classification Search .................. 55/323, 55/525, 319, 322, DIG. 17, DIG. 25, 431, 55/337, 399, 218, 333, 486, 219, 329, 421, 55/423, 425; 210/314, 315, 316; 96/408; 137/204, 495
See application file for complete search history.

(56) References Cited

U.S. PATENT DOCUMENTS

| | | | | |
|---|---|---|---|---|
| 2,036,106 A | * | 3/1936 | Stuard ........................ 137/204 |
| 4,692,175 A | * | 9/1987 | Frantz ........................ 96/408 |
| 4,822,387 A | * | 4/1989 | Daniels ....................... 55/323 |
| 4,848,989 A | * | 7/1989 | Maeda ........................ 55/319 |
| 4,897,094 A | * | 1/1990 | Maeda ........................ 96/409 |
| 4,925,466 A | * | 5/1990 | Overby ....................... 55/319 |
| 5,145,497 A | * | 9/1992 | Maeda ........................ 96/409 |
| 5,385,592 A | * | 1/1995 | Maeda ........................ 55/323 |
| 5,409,514 A | * | 4/1995 | Ragusa et al. ............... 55/319 |
| RE35,433 E | * | 1/1997 | Alexander, III .............. 55/466 |
| 5,803,715 A | * | 9/1998 | Kitchener .................... 417/295 |
| 5,888,259 A | * | 3/1999 | Maeda ........................ 55/323 |
| 6,159,259 A | * | 12/2000 | Maeda ........................ 55/323 |
| 6,416,563 B1 | * | 7/2002 | Wright et al. ................. 55/513 |
| 6,581,297 B1 | * | 6/2003 | Ginder ........................ 34/79 |

* cited by examiner

*Primary Examiner*—Duane Smith
*Assistant Examiner*—Minh-Chau T. Pham
(74) *Attorney, Agent, or Firm*—Baker & Hostetler LLP

(57) ABSTRACT

A coalescing type gas filter includes a filtering element enclosed in an inner chamber which is housed in an outer chamber and a drain device to simultaneously drain accumulated liquid in both the inner chamber and the outer chamber. The drain device contains a pressure sensitive valve that regulates opening of the drain in response to a drop in pressure.

14 Claims, 2 Drawing Sheets

COALESCING TYPE FILTER APPARATUS AND METHOD

FIELD OF THE INVENTION

The present invention relates generally to a filter arrangement and filtering method for use with a vessel containing a pressurized fluid. More particularly, the arrangement includes a coalescing filter assembly disposable inside a vessel.

BACKGROUND OF THE INVENTION

Coalescing filters are used in applications to remove liquids, such as water or oil, from fluids. Typically, such filters are located downstream of a vessel or cylinder containing the fluid, such as air or gas. Because of the large pressure differential that may exist between the interior and exterior of the filters, coalescing type filters are typically provided with a rather thick-walled filter housing that is costly to manufacture. Because of limited available space, however, the filter housings are usually relatively small and as a result, frequent servicing of the filters is typically required to drain off coalesced liquids.

A coalescing type filter is designed to remove oil and water aerosols by means of coalescence. That is, small droplets of moisture or oil adhere to a filter medium and coalesce into larger liquid droplets that can be collected and removed from the filter. Flow through the filter is usually from an inside chamber to an outside chamber though the alternate is also possible.

In general, coalescing filters embody two separate chambers that are at different pressures, such that the pressure differential directs flow of a gaseous stream from a region of higher pressure to a region of lower pressure. In many cases, the two chamber design of coalescing type filters results in the accumulation of liquid within each separate chamber and engineering challenges remain in removing accumulated liquid from either chamber without re-introducing the removed liquids back into the gas stream.

Therefore, there is a need to provide an apparatus and method for removal of liquid from a coalescing-type filter from two separate chambers at two different operating pressures. It is also preferable to provide a method and apparatus for removing liquid at two locations at two different pressures simultaneously.

SUMMARY OF THE INVENTION

The foregoing needs are met, to a some extent, by the present invention, wherein in one aspect an apparatus is provided that in some embodiments incorporates a mechanism for draining two locations at different operating pressures simultaneously.

In accordance with one embodiment of the present invention, a filter for removing liquids from a pressurized gaseous stream is provided comprising a filter element disposed in a body defining an inner chamber and an inner chamber pressure; a housing, having the body disposed therein and an outer chamber and outer chamber pressure defined by a region outside the inner chamber and inside the housing; and a drain device, having an orifice in the inner chamber and the outer chamber for draining the liquids from both the inner chamber and the outer chamber from the filter.

In some embodiments, the drain device may comprise a spring loaded ball or valve to regulate drainage of the liquid in the inner chamber. In some operations, the outer chamber pressure may be greater than the inner chamber pressure. In such cases, the spring loaded ball or valve may be predisposed to plug the drain. When the pressure of the outer chamber equals or drops below that of the inner chamber, the spring loaded ball or valve of the drain device may be biased to drain the inner chamber through the inner chamber drain orifice. Filters elements of the present invention may also comprise filter media known in the art.

In accordance with another embodiment of the present invention, a method of filtering liquids from a pressurized gaseous stream is provided comprising a filter element disposed in a body defining an inner chamber and an inner chamber pressure; housing the filter in a housing, having the body disposed therein and an outer chamber and outer chamber pressure defined by a region outside the inner chamber and inside the housing; and draining liquids from both the inner chamber and the outer chamber from the filter through a drain device having an orifice in the inner chamber and the outer chamber.

In some embodiments, the drain device may comprise a spring loaded ball or valve to regulate drainage of the liquid in the inner chamber. In some operations, the outer chamber pressure may be greater than the inner chamber pressure. In such cases, the spring loaded ball or valve may be predisposed to plug the drain. When the pressure of the outer chamber equals or drops below that of the inner chamber, the spring loaded ball or valve of the drain device may be biased to drain the inner chamber through the inner chamber drain orifice. Filters elements of the present invention may also comprise filter media known in the art.

In accordance with yet another embodiment of the present invention, a device for filtering liquids from a pressurized gaseous stream is provided comprising a filtering means disposed in a body defining an inner chamber and an inner chamber pressure; a housing means, having the body disposed therein and an outer chamber and outer chamber pressure defined by a region outside the inner chamber and inside the housing means; and a draining means, having an orifice in the inner chamber and the outer chamber for draining the liquids from both the inner chamber and the outer chamber from the device.

In some embodiments, the draining means may comprise a spring loaded ball or valve to regulate drainage of the liquid in the inner chamber. In some operations, the outer chamber pressure may be greater than the inner chamber pressure. In such cases, the spring loaded ball or valve may be predisposed to plug the drain. When the pressure of the outer chamber equals or drops below that of the inner chamber, the spring loaded ball or valve of the draining means may be biased to drain the inner chamber through the inner chamber drain orifice. The device of the present invention may also comprise filter media known in the art.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
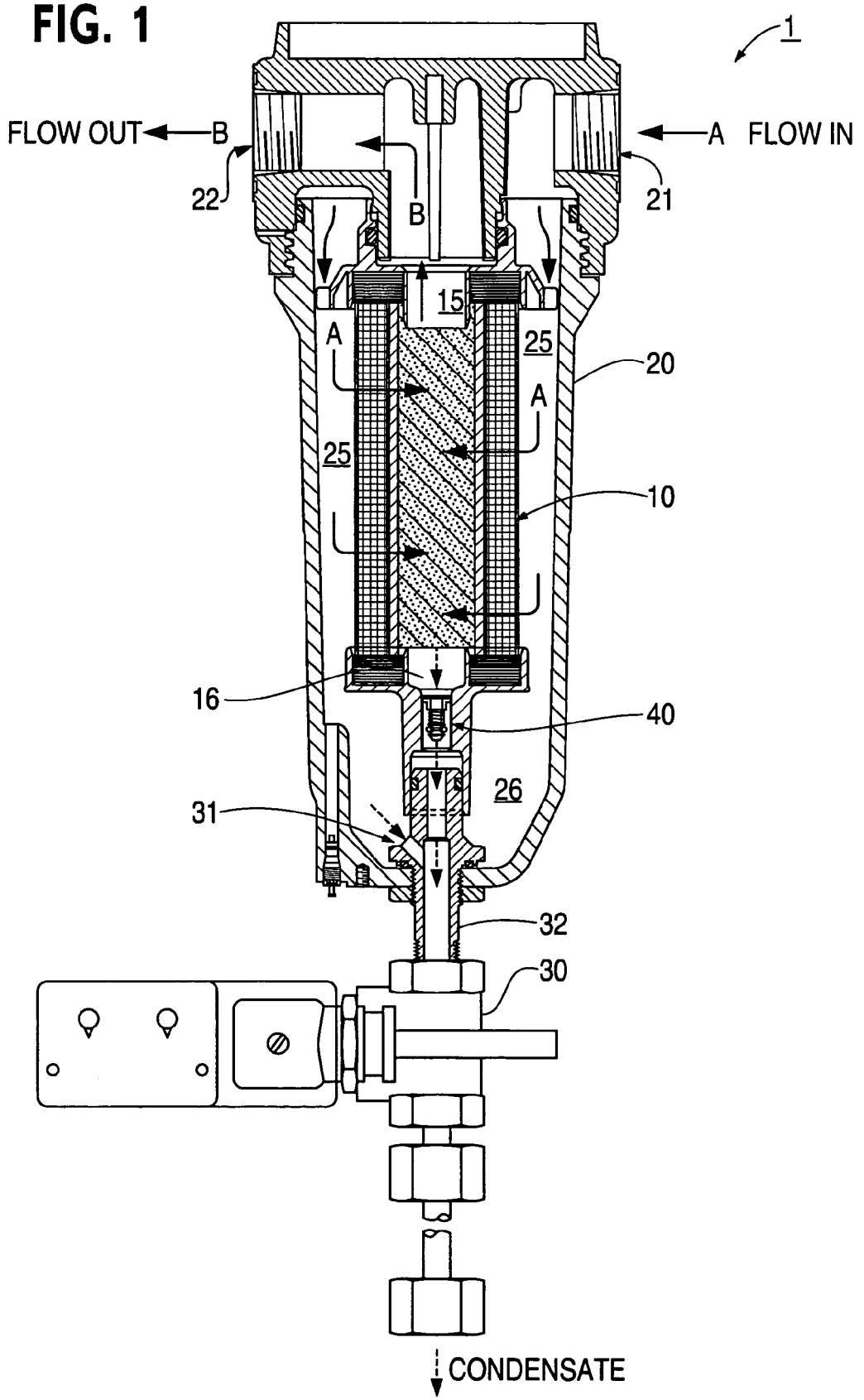
FIG. 1 is a cross-section view illustrating a coalescing type filter according to one embodiment of the invention.

The invention will now be described with reference to the drawing figures, in which like reference numerals refer to like parts throughout. FIG. 1 shows a coalescing-type filter 1 in one embodiment of the present invention. It should be noted that coalescing filter structures and designs of the present invention can utilize a variety of forms including those of conventional coalescing filter structures, for example, discs, flat panels, and pleated or unpleated cylinders. They may also comprise simple or composite media.

Coalescing filters of the instant application may be used in applications to remove liquids, such as water or oil, from fluids, such as gas or air. The term oil includes at least petroleum based and synthetic hydrocarbons plus other synthetic oils such as di-esters which can affect materials such as acrylics in downstream equipment or processes.

As depicted in FIG. 1, a preferred filter 1 comprises a cylindrical filter element 10, housed within a cylindrical housing 20. An undried gaseous stream A enters the filter 1 through an opening 21 in the housing 20 into a chamber 25 of the cylindrical filter element 10. Once in the chamber 25, the gaseous stream A passes through the filter element 10 to an interior chamber 15 which is at a lower pressure than the chamber 25. A dried gas stream B then exits the filter 1 through an exit 22.

Upon entering the chamber 25, liquid that may have already precipitated from the gas stream A is pre-separated from the gas stream A. Preferably, in some embodiments, a centrifugal force is applied to the gas/liquid as it enters the chamber 25 such that droplets of liquid are removed from the entering gas stream before the gas stream A enters the filter element 10. As better illustrated, in FIG. 2, a top spin adaptor 50 may comprise fins 55 that extend from the top of filter element 10 and abut the inside wall of housing 20 in some embodiments. The use of the fins 55 cause the entering gas stream A to spin as it enters the chamber 25. Often times, this initial spinning of the entering gas stream is sufficient to remove in excess of 50%, and sometimes 90%, of the liquid already condensed in the gas stream A.

Liquid that has been removed during the pre-separation step is generally collected along the inner wall of the housing 25 and may then flow drown by gravity to the bottom of a bowl portion 26 of the housing chamber 25. The accumulated liquid in the bowl 26 can be then drained through drain device 30 automatically or manually by an operator.

As mentioned above, the gas stream A flows through the filter 1 from the outside chamber 25 to the inside chamber 15, moving from a region of higher pressure to one of lower pressure, respectively. The gas stream A that enters the chamber 25 is at a pressure generally about 1 to about 10 psi greater than that of the interior 15. More preferably, the pressure differential is about 2 psi between the outer and inner chambers 25 and 15.

Still referring back to FIG. 1, a check device 40 is provided to provide an anti re-entrainment barrier to prevent droplets that may have collected in the bowl 26 from being reintroduced to the dried gas stream B. In one embodiment, the check device 40 is incorporated within the filter element 10 to separate the two condensate chambers 15 and 25. The check device 40 may comprise a valve or a ball, but any device or mechanism that allows for draining two locations (chamber 25 and chamber 15) at different operating pressures simultaneously is within the scope of the present invention.

The check device 40 may comprise, for example, a ball and be spring loaded for regulation based on pressure applied to the device. A drain port 31 comprising an orifice is located at the high pressure port via a conduit 32. The orifice 31 allows the flow of condensate only from the high-pressure port/orifice 31 thereby reducing the pressure in the conduit 32. The conduit 32 is also connected to the check device 40 which rests between the two chambers 15 and 25. Therefore, when the pressure in the conduit 32 is reduced, the check device 40 opens allowing condensate from the lower pressure chamber 15 to drain at the same time as the higher pressure chamber 25.

In other words, during normal filtering operation, the higher pressure in chamber 25 than in interior 15 should cause the check device 40 to bias upward into interior 15 plugging access of any accumulated liquids therein to the drain 30. However, when the drain 30 is opened, the pressure in the chamber 25 should drop below the pressure in interior chamber 15 thereby biasing the check device 40 downward. Once the check device 40 is unplugged, any liquid that may have accumulated in the bottom 16 of interior 15 can be drained through the drain 30.

Figure 2:
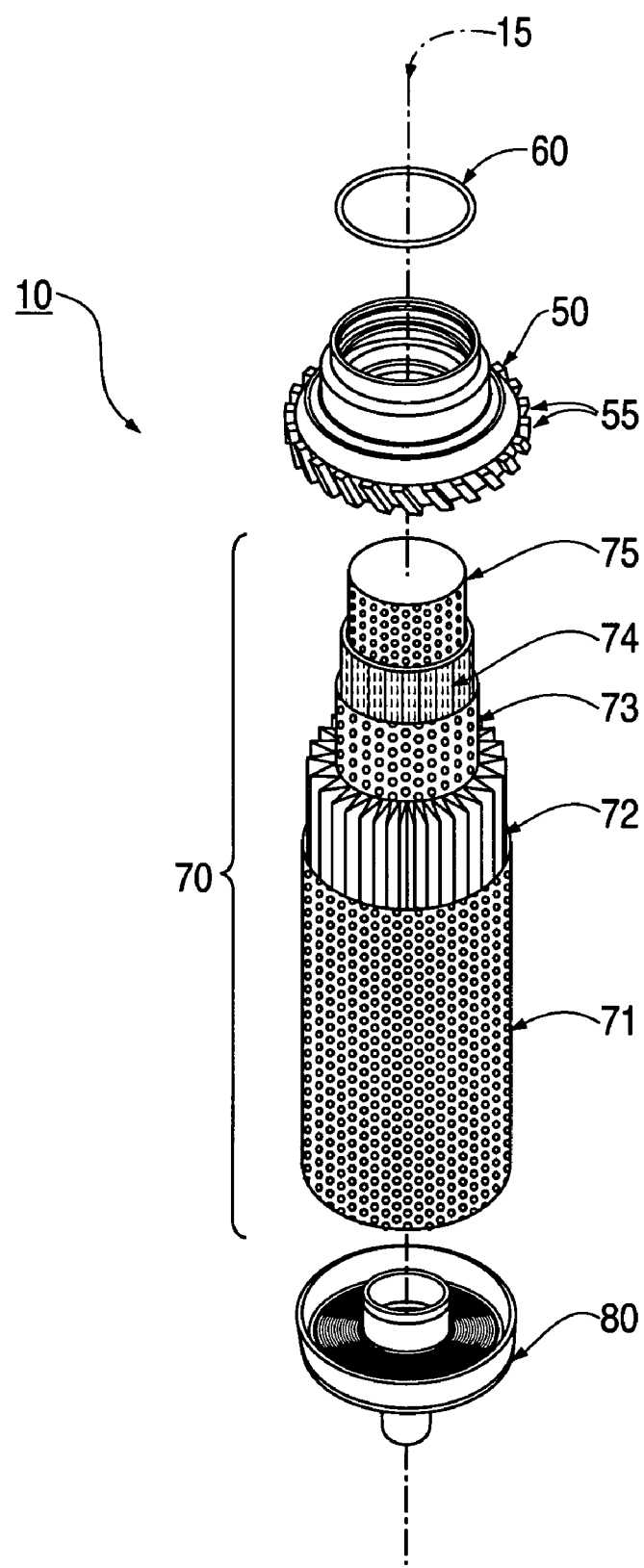
FIG. 2 is a cutaway view of a filter element according to the embodiment of FIG. 1.

A variety of coalescing filter media but a variety of coalescing filter structures, as well as a variety of coalescing filter media, are suitable. In FIG. 2, one embodiment of one filter element 10 suitable for the present invention is depicted. The filter element 10 comprises an O-ring 60 which should be selected to seal the element 10 from its housing 25. The O-ring 60 may comprise any material, but preferably comprises materials that can withstand wear and tear in the presence of various oils that it may contact. Moving down through the element 10, the top spin adaptor 50 rests atop the element 10. As mentioned above, the top spin adaptor 50 may comprise fins 55 that extend from the top of filter element 10 and abut the inside wall of housing 20.

The filtering components 70 of the filter element 10 comprise a media stage 72 and a drain stage 74 that are placed between structural elements—outer tube 71, center tube 73 and inner tube 75. The tubes 71, 73, and 75, need to be porous to allow for flow of gas stream A from the exterior chamber 25 through the components 70 and into the interior chamber 15. In addition, the tubes 71, 73, and 75, should be able to comprise of material and design so as to be able to maintain structural integrity in the presence of high pressures and pressure differential between the chambers 25 and 15.

The media stage 72 may comprise a plurality of material known and present in the art. The selection of a media for filtration may be specific to the application and in many instances, will be known to one of ordinary skill in the art. In the preferred embodiment, the media stage 72 may be pleated and comprise microglass fiber with fibers 1-2 uM in diameter. The pleated surface is desireable in some applications for its greater surface area which can extend the life and flow through of the media stage 72.

The drain stage 73 may comprise an open cell foam or needle felt. The drain stage 73 may be designed to funnel or direct coalesced droplets from the media stage 72 to a bottom cap 80. Bottom cap 80 is designed to join the bottom cap 80 to the filtering components 70 in an air tight fashion. The bottom cap 80 may also comprise check device 40. The bottom cap 80 should be designed to collect condensed liquids until a time they are drained. Preferably, however, not only the filter media 72 but all parts of the filter structure, e.g., any end caps 80, support tubes 71, 73, and 75, have critical surface energies less than the surface tension of the liquid to be removed, whether as a result of appropriate selection of the composite materials or of treatment to modify the surface properties.

Coalescing filters in accordance with the subject invention preferably comprise porous fibrous media. The filters in accordance with the subject invention may have constant pore size or tapered pore sizes, and they may be composite structures comprising multiple filter medium layers and/or multiple support layers.

For the removal of water-based aerosols, the pore size will typically be in the range of from about 1 to about 20 micrometers, more preferably from about 4 to about 20 micrometers. Resistance to flow is much lower than with conventional coalescers under the same conditions, e.g., on the order of 20 to 50 percent of conventional coalescers, e.g., from about 0.1 to about 2.0 pounds per square inch differential (psid) or less, or, at equal pressure drops, much higher flow rates can be obtained.

The filter media 72 should have the defined critical surface energy, i.e., be lower than the surface tension of the liquid to be removed. Preferably, the entire element 10 that comes in contact with the gas being filtered has the defined critical surface energy, including the support layers and, in the case of a filter cartridge, the end caps. To obtain the desired surface properties, it may be necessary to modify some or all layers of the filter medium, as described in greater detail below, by the use of surface-modifying agents to provide the requisite critical surface energy.

Fibrous filter media in accordance with the subject invention may be made from organic or inorganic fibers. Exemplary organic microfibers include those made from polyolefins, for example, polyethylene, polypropylene, polymethylpentane, polyisobutylene, and copolymers thereof, for example, ethylenepropylene, polyesters, for example, polybutylene terephthalate and polyethylene terephthalate, and polyamides, for example, polyhexamethylene adipamide (nylon 66), polyhexamethylene sebacamide (nylon 610), nylon 11 (prepared from 11-amino-nonanolic acid), and homopolymers of poly-e-caprolactam (nylon 6), and mixtures or blends of such polymers. The microfibers may be made of other polymers which can be formed into microfibers, and mixtures of microfibers also can be used. Exemplary inorganic fibers include those made from glass and metal titanates, e.g., potassium titanate.

The fibers generally will have diameters of from about 0.1 to about 20 micrometers, although finer or coarser fibers may be used. The fibers may vary in length from relatively short staple-like microfibers of about 0.5 inch or less up to substantially continuous filaments several feet or more in length. Typically, the median length to diameter ratio of the fibers (aspect ratio) will be in the range of from 500 to 1,000.

The material of which the media is primarily composed may be selected so that the resulting media will have surface properties within the scope of this invention. Generally, however, it may be less expensive and more expeditious simply to modify commercially available coalescing filter media. It also may be desirable in that structural, non-shedding, and other beneficial features of media may be achieved where the component materials otherwise would not produce a medium having the defined surface energies. The surface properties of conventional coalescing filter media may be modified by any of a number of well-known surface-modifying or treating agents.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A filter for removing liquids from a pressurized gaseous stream, the filter comprising:
   (a) a filter element disposed in a body defining an inner chamber and an inner chamber pressure;
   (b) a housing, having the body disposed therein and an outer chamber and outer chamber pressure defined by a region outside the inner chamber and inside the housing; and
   (c) a drain device, having an orifice in the inner chamber and the outer chamber for draining the liquids from both the inner chamber and the outer chamber from the filter, wherein the drain device comprises a spring loaded ball or valve to open or shut the orifice in the inner chamber, and wherein the spring loaded ball or valve shuts the inner chamber drain orifice when the outer chamber pressure is greater than the inner chamber pressure.

2. The filter of claim 1, wherein the outer chamber pressure is greater than the inner chamber pressure.

3. The filter of claim 1, wherein the filter element further comprises a filter media within the filter element.

4. The filter of claim 1, wherein the spring loaded ball or valve opens the inner chamber drain orifice when the inner chamber pressure is substantially equal to or greater than the outer chamber pressure.

5. A method of filtering liquids from a pressurized gaseous stream, the method comprising:
   (a) providing a filter element disposed in a body defining an inner chamber and an inner chamber pressure;
   (b) housing the filter element in a housing, having the body disposed therein an outer chamber and outer chamber pressure defined by a region outside the inner chamber and inside the housing; and
   (c) draining liquids from both the inner chamber and the outer chamber from the filter through a drain device having an orifice in the inner chamber and the outer chamber, wherein the drain device comprises a spring loaded ball or valve to open or shut the orifice in the inner chamber, and wherein the spring loaded ball or valve shuts the inner chamber drain orifice when the outer chamber pressure is greater than the inner chamber pressure.

6. The method of claim 5, wherein the outer chamber pressure is greater than the inner chamber pressure.

7. The method of claim 5, wherein the filter element further comprises a filter media within the filter element.

8. The method of claim 5, wherein the spring loaded ball or valve opens the inner chamber drain orifice when the inner chamber pressure is substantially equal to or greater than the outer chamber pressure.

9. A device for filtering liquids from a pressurized gaseous stream, the device comprising:
 (a) filtering means disposed in a body defining an inner chamber and an inner chamber pressure;
 (b) housing means, having the body disposed therein and an outer chamber and outer chamber pressure defined by a region outside the inner chamber and inside the housing means; and
 (c) draining means, having an orifice in the inner chamber and the outer chamber for draining the liquids from both the inner chamber and the outer chamber from the device, wherein the draining means comprises a spring loaded ball or valve to open or shut the orifice in the inner chamber, and wherein the spring loaded ball or valve shuts the inner chamber drain orifice when the outer chamber pressure is greater than the inner chamber pressure.

10. The device of claim 9, wherein the outer chamber pressure is greater than the inner chamber pressure.

11. The device of claim 9, wherein the filtering means further comprises a filter media within the filtering means.

12. The device of claim 9, wherein the spring loaded ball or valve opens the inner chamber drain orifice when the inner chamber pressure is substantially equal to or greater than the outer chamber pressure.

13. The filter of claim 1, wherein the drain device has a first portion engaged with the inner chamber and a second portion engaged with the outer chamber such that the inner chamber is separated from the outer chamber.

14. The filter of claim 1, wherein the drain device is engaged with the inner chamber and the outer chamber, the drain device being configured so as to seal the inner chamber from the outer chamber.

* * * * *